United States Patent
Lagos et al.

(10) Patent No.: US 10,235,411 B2
(45) Date of Patent: Mar. 19, 2019

(54) ONLINE DYNAMIC SOLUTION RETRIEVAL BASED ON AUTOMATIC KEYWORD SELECTION DURING CUSTOMER DIALOGUE

(71) Applicant: Conduent Business Services, LLC, Dallas, TX (US)

(72) Inventors: Nikolaos Lagos, Grenoble (FR); Salah Aït-Mokhtar, Meylan (FR)

(73) Assignee: Conduent Business Services, LLC, Dallas, TX (US)

( * ) Notice: Subject to any disclaimer, the term of this patent is extended or adjusted under 35 U.S.C. 154(b) by 352 days.

(21) Appl. No.: 14/733,600

(22) Filed: Jun. 8, 2015

(65) Prior Publication Data
US 2016/0358242 A1    Dec. 8, 2016

(51) Int. Cl.
| | | |
|---|---|---|
| *G06Q 30/00* | (2012.01) | |
| *G06F 17/30* | (2006.01) | |
| *G06Q 30/06* | (2012.01) | |
| *G06Q 30/02* | (2012.01) | |

(52) U.S. Cl.
CPC .. *G06F 17/30401* (2013.01); *G06F 17/30554* (2013.01); *G06F 17/30867* (2013.01); *G06Q 30/02* (2013.01); *G06Q 30/0625* (2013.01)

(58) Field of Classification Search
None
See application file for complete search history.

(56) References Cited

U.S. PATENT DOCUMENTS

| | | | |
|---|---|---|---|
| 2001/0054064 A1* | 12/2001 | Kannan | G06F 17/30867 709/203 |
| 2002/0103797 A1* | 8/2002 | Goel | G06F 17/30864 |
| 2004/0008828 A1* | 1/2004 | Coles | H04M 3/4936 379/88.01 |
| 2007/0192085 A1 | 8/2007 | Roulland et al. | |
| 2008/0172422 A1* | 7/2008 | Li | G06F 17/30867 |
| 2009/0106224 A1 | 4/2009 | Roulland et al. | |

(Continued)

OTHER PUBLICATIONS

Xia, Huosong, Knowledge Management Support of Real-Time Decision Making for Customer Service Support Systems, Jan 1, 2005, International Conference on Service Systems and Service Management, 2005, vol. 2, pp. 903-907 (Year: 2005).*

(Continued)

*Primary Examiner* — William J Allen
*Assistant Examiner* — Timothy J Kang
(74) *Attorney, Agent, or Firm* — Fay Sharpe LLP

(57) ABSTRACT

A system and method provide assistance to an agent in responding to a customer query. A dialog including communications between a customer and an agent is displayed to an agent on a display device. During the dialog, keywords are extracted from at least one of the customer's text communications. This includes identifying keywords that are found in a set of terms extracted from a knowledge base. A search query is generated, based on the extracted keywords. Results of the search query are retrieved from at least one of the knowledge base and an external website. The results are displayed on the display device contemporaneously with at least a portion of the text communications, allowing the agent to quickly copy and paste text from one of the results into his response without having to leave the window in which the communications are displayed.

16 Claims, 3 Drawing Sheets

(56) References Cited

U.S. PATENT DOCUMENTS

| | | |
|---|---|---|
| 2012/0089683 A1 | 4/2012 | Griesmer et al. |
| 2014/0288920 A1 | 9/2014 | Proux |
| 2016/0180257 A1* | 6/2016 | Rees ................. G06Q 10/02 705/5 |

OTHER PUBLICATIONS

U.S. Appl. No. 14/702,850, filed May 4, 2015, Dymetman, et al.
Hui, et al., "A web-based intelligent fault diagnosis system for customer service support," Engineering Applications of Artificial Intelligence 14, pp. 537-548 (2001).
Leung, et al., "No More "Keyword Search" or FAQ: Innovative Ontology and Agent Based Dynamic User Interface," IAENG International Journal of Computer Science, vol. 33, No. 1, IJCS_33_1_22, pp. 1-6 (2007).
Hassanzadeh, et al., "Helix: Online Enterprise Data Analytics," WWW 2011, pp. 1-4 (2011).

* cited by examiner

ONLINE DYNAMIC SOLUTION RETRIEVAL BASED ON AUTOMATIC KEYWORD SELECTION DURING CUSTOMER DIALOGUE

BACKGROUND

The exemplary embodiment relates to communications between an agent and a customer and finds particular application in connection with a system and method for assisting an agent to generate a response to a customer query.

In a customer care environment, agents respond to inquiries from customers and often search for information that may assist the agent in responding to the customer inquiry. The agent may use an in-house solution database but frequently searches are performed online using an Internet search engine to retrieve information.

The communication between clients and the customer care center is often done via chat tools. A standard dialogue may start with the customer (i.e., person that contacts the center) initiating a chat with an agent, describing the problem and asking for a solution. Often, the problem description is not complete at the beginning of the dialogue, so the agent has to interact/chat with the customer in order to further clarify the issue. The agent may manually search the solution database to find a relevant solution, and if none is found, may then manually search the web. This may include selecting part of the dialogue content to be used for the search and copying and pasting the selection into the interface of a search engine, or writing a set of keywords that correspond to the selection and then launching the query. The agent then clicks on one or more of the links found by the search engine and checks to see if the document contains a relevant solution. This often takes place while the agent is trying to maintain the conversation.

While the search can yield useful results, the time taken can have a negative impact on the interaction, even though it may take less than a minute or a few seconds to complete. While conducting the search, the agent's attention is often not focused on the dialogue. The agent may have to break off from the search to type a response to the customer. Often, the agent may respond with one of a set of stock responses which are intended merely to reassure the customer that the agent is working on the customer's problem and which do not advance the dialogue.

To expedite the search, the agent may simply copy and paste a large chunk of the dialogue. As a result, the search may include terms that are not specific to the customer's query, such as words of greeting or other common words and phrases (e.g., 'at work', 'since last week', etc.). The agent can remove these extraneous terms but this requires additional time dedicated to the search.

Even a few seconds saved during the interaction of the agent with the customer can have a significant impact, both in terms of the agent's productivity and in the customer's satisfaction, which can impact whether the customer will do business with the company in the future.

There remains a need for a system and method for assisting an agent which automates the search for information that is relevant to the customer's query.

REFERENCES

The following references, the disclosures of which are incorporated herein in their entireties by reference, relate generally to the customer care field:

U.S. Pub. No. 20120089683, published Apr. 12, 2012, entitled AUTOMATED ASSISTANCE FOR CUSTOMER CARE CHATS, by Stephen J. Griesmer, et al.

U.S. Pub. No. 20040008828, published Jan. 15, 2004, entitled DYNAMIC INFORMATION RETRIEVAL SYSTEM UTILIZING VOICE RECOGNITION, by Scott Coles, et al.

U.S. application Ser. No. 14/702,850, filed May 4, 2015, entitled METHOD AND SYSTEM FOR ASSISTING CONTACT CENTER AGENTS IN COMPOSING ELECTRONIC MAIL REPLIES, by Marc Dymetman, et al.

BRIEF DESCRIPTION

In accordance with one aspect of the exemplary embodiment, a method for assisting an agent includes, during a dialogue including communications between a customer and an agent which are displayed to an agent on a display device, where the communications include customer text communications generated by the customer and agent text communications generated by the agent, extracting keywords from at least one of the customer text communications. The keyword extraction includes identifying keywords in the customer text communication that are found in a set of terms extracted from a knowledge base. A search query is generated, based on the keywords extracted from at least one of the customer communications. Results of the search query are retrieved from at least one of the knowledge base and an external website. Provision is made for at least one of the results of the search query to be displayed on the display device contemporaneously with at least a portion of the text communications.

At least one of the extracting keywords, generating a search query and providing for the display of the result may be performed with a computer processor.

In accordance with another aspect of the exemplary embodiment, a system for assisting an agent includes memory which stores a set of terms extracted from a knowledge base. A keyword identification component which extracts keywords from at least one customer text communication, during text communications between a customer and an agent which are displayed to an agent on an associated display device. The keyword extraction includes identifying keywords in the text communication that are found in a set of terms extracted from a knowledge base. A meta-search engine generates a search query based on the keywords extracted from the at least one customer communication and retrieves results of the search query from at least one of the knowledge base and an external website. A graphical user interface generation component generates a graphical user interface for display on the display device. The graphical user interface displays one or more of the results of the search query while displaying at least a portion of the text communications. A processor implements the keyword identification component, meta-search engine, and graphical user interface generation component.

In accordance with another aspect of the exemplary embodiment, a method for assisting an agent to respond to a customer's query is provided. In a first region of a graphical user interface, communications between the customer and the agent are displayed. The communications include customer text communications generated by the customer interspersed with agent text communications generated by the agent. Keywords are extracted from the customer text communications. The extraction includes identifying keywords in the customer text communication that are found in a set of terms extracted from a knowledge base. The knowledge base and one or more external websites are queried based on the keywords extracted from the at least one customer communication. In a second region of the graphical user interface, retrieved results of the search query are displayed. The agent is able to read one of the customer's communications and generate a communication in response thereto using text of one of the displayed results.

At least one of the displaying communications, extracting keywords, querying the knowledge base and the external website, and displaying retrieved results may be performed with a computer processor.

DETAILED DESCRIPTION

The exemplary embodiment relates to a system and method for assisting an agent, such as a customer care agent, when conducting a dialogue with a customer by electronic text communications, such as via an online live chat, email, or text message (SMS) through which the agent tries identify the customer's problem and identify an appropriate solution which is helpful to the customer. The system assists the agent to compose a response by automatically extracting keywords from the dialogue, generating a search therefrom, and presenting retrieved search results to the agent in a manner which allows the agent to select text for incorporation into a response.

Figure 1:
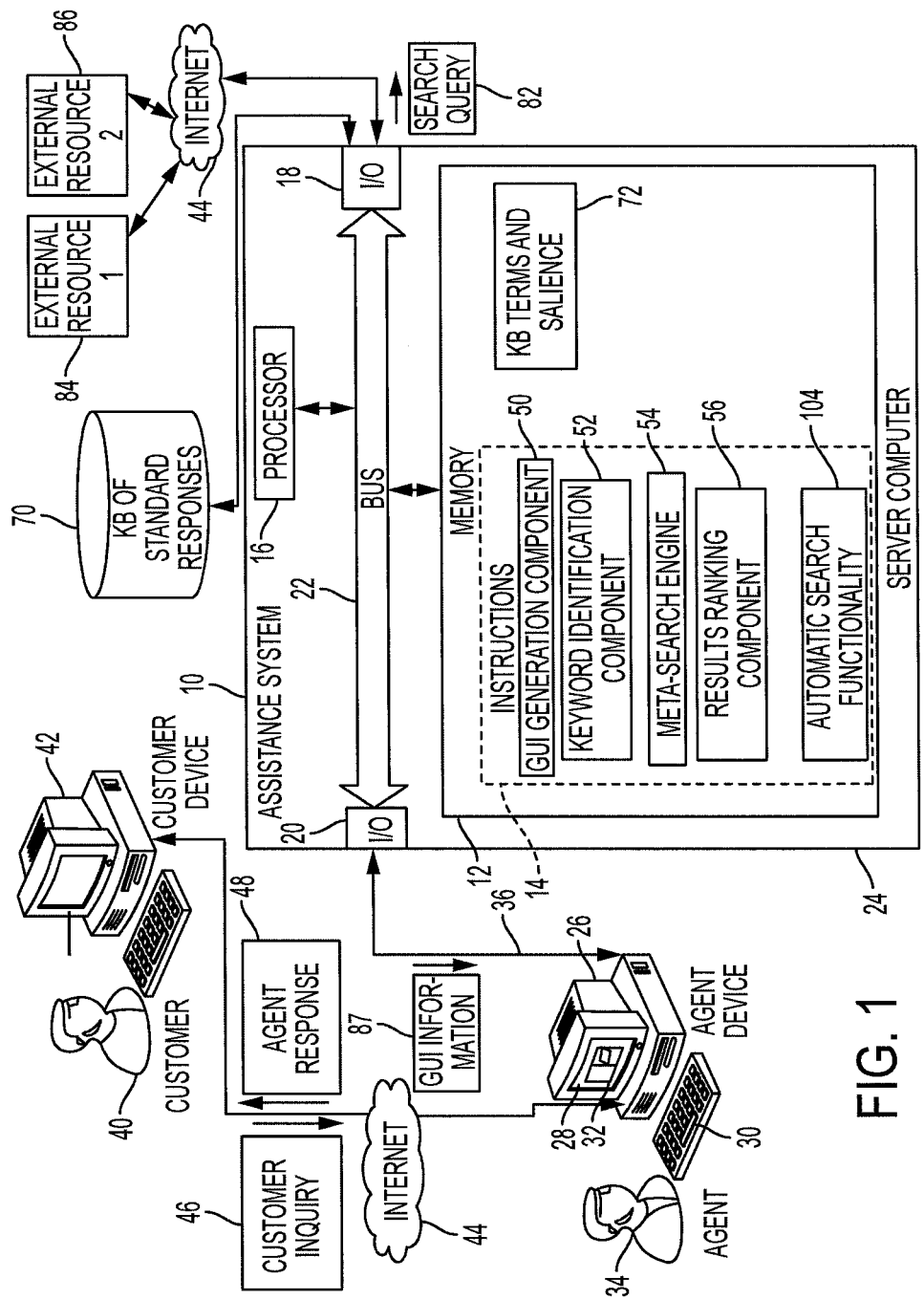
FIG. 1 is a functional block diagram of a system for assisting an agent to compose a response to a customer query in accordance with one aspect of the exemplary embodiment.

With reference to FIG. 1, a functional block diagram of a computer-implemented system 10 for assisting an agent to identify information that is relevant to a customer query, e.g., by assisting the agent in identifying a solution to a problem faced by the customer. The customer may be any person seeking assistance from the agent regarding a product or service, such as a purchaser, lessor, owner, prospective purchaser, salesperson, or the like. The agent is typically a trained representative of an organization which provides the goods or services to customers and may be located in a customer care center.

Figure 2:
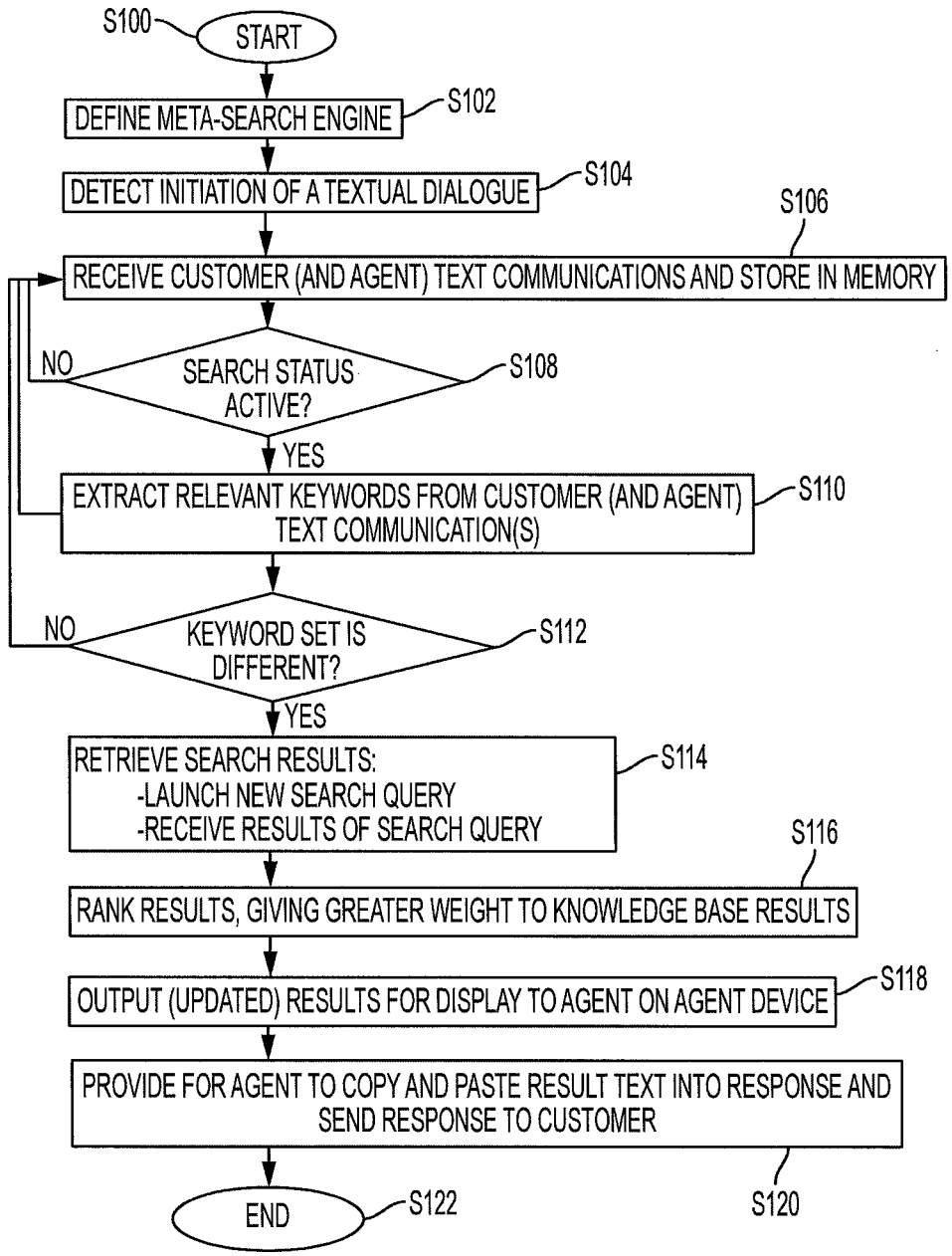
FIG. 2 is a flow chart illustrating a method for assisting an agent to compose a response in accordance with another aspect of the exemplary embodiment.

The illustrated assistance system 10 includes memory 12 which stores instructions 14 for performing the method illustrated in FIG. 2 and a processor 16 in communication with the memory for executing the instructions. The system 10 also includes one or more input/output (I/O) devices, such as a network interface 18 and a user input/output interface 20. The various hardware components 12, 16, 18, 20 of the system 10 may all be communicatively connected by a data/control bus 22.

The computer system 10 may include one or more computing devices 24, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 24.

The network interface 18 allows the computer to communicate with other devices via a computer network, such as a local area network (LAN) or wide area network (WAN), or the internet, and may comprise a modulator/demodulator (MODEM) a router, a cable, and/or Ethernet port.

The I/O interface 20 may communicate with a user interface (agent device) 26 which includes a display device 28, for displaying information to users (agents), and a user input device 30, such as a keyboard, keypad, or touch or writable screen, and/or a cursor control device, such as mouse, trackball, or the like, for inputting text and for communicating user input information and command selections to the processor device 16. The agent device 26 displays a graphical user interface (GUI) 32 for assisting an agent 34 to maintain a dialogue with the customer and, at the same time, retrieve information relevant to the inquiry. The graphical user interface 32 is described in further detail below with reference to FIG. 3. The agent device 26 and server computer 24 are linked by a wired or wireless link 36, such as a local area network or a wide area network, such as the Internet. In other embodiments, the system 10 may be hosted by the agent's device 26.

In a typical chat (textual dialogue), a customer 40, operating on a customer computing device 42, initiates the chat, for example, by actuating a link on a company website, responding to an invitation to take part in a chat, or by sending an email or text. The agent and customer communicate via a wired or wireless link 44, such as the Internet, often via an intermediate server computer, such as computer 24. Through a dialogue of text communications, the agent 34 identifies the details of the customer textual inquiry 46 and provides a textual response 48. Each text communication includes a text string, i.e., a sequence of one or more words in a natural language (generally more than one word, such as a sentence), which is generated and sent by one of the customer and agent to the other. Each text communication is generally followed by a text communication sent by the recipient.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary software instructions 14 include a GUI generation component 50, a keyword identification component 52, a meta-search engine 54, and a results ranking component 56.

Figure 3:
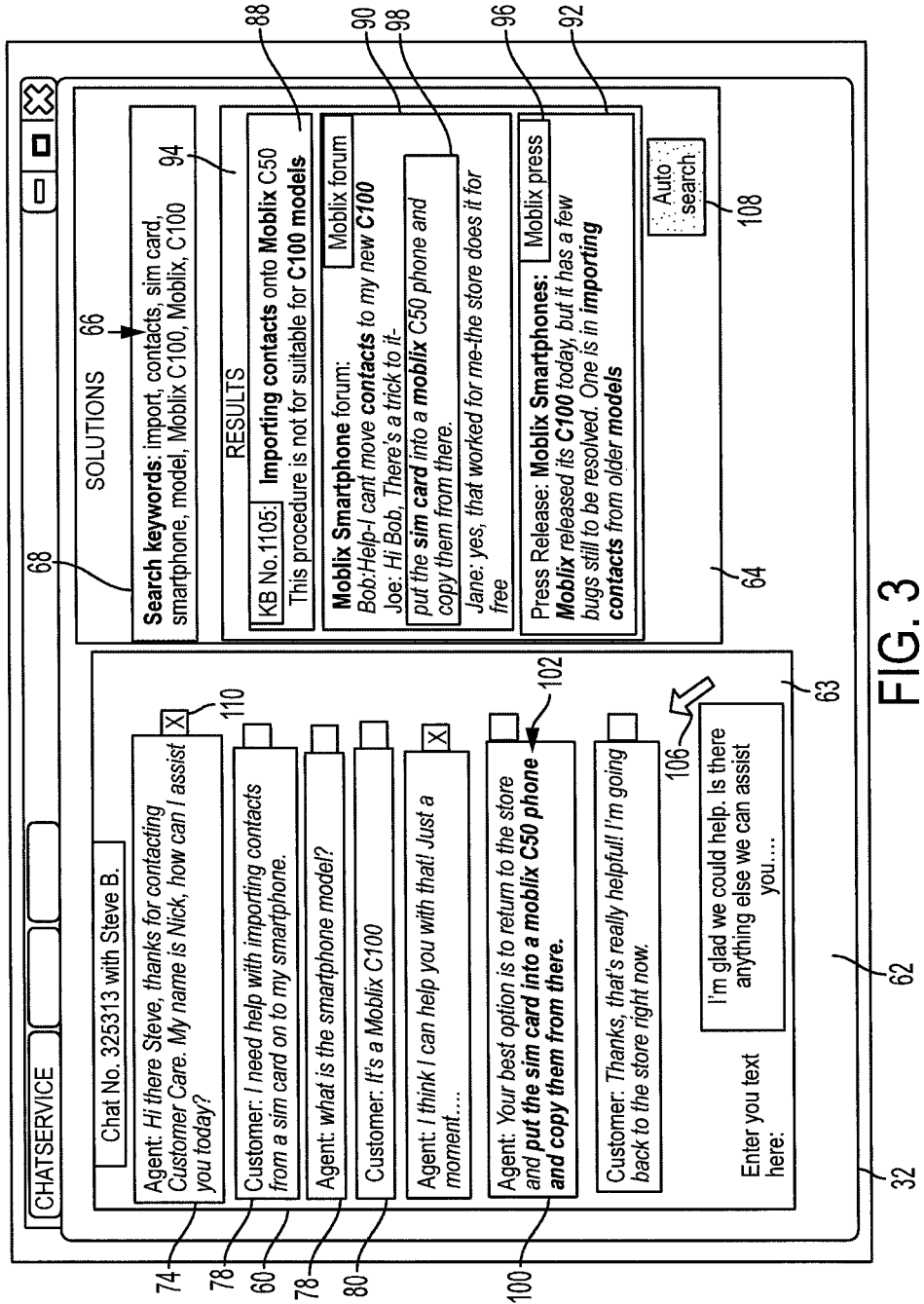
FIG. 3 illustrates a graphical user interface displayed on an agent's device.

With reference also to FIG. 3, the GUI generation component 50 generates the GUI 32 for display to the agent, which allows the agent to view the dialogue 60 as it proceeds and to conduct searches and see their results within respective first and second non-overlapping regions of the same window 62. In the illustrated embodiment, the dialogue, or at least a more recent part of it, is displayed in a chat panel on 63 one side of the window 62 while the search is simultaneously displayed in a solution panel 64 on the other side of the window, although other arrangements are contemplated. The keyword identification component 52 automatically extracts keywords 66 from the dialogue 60, which are displayed to the agent in a search box 68. The system has access to an internal knowledge base 70, which in the exemplary embodiment is an organized repository of problem and solution descriptions related to the specific product(s) or service(s) for which the agent has been trained to assist customers. In general, each problem description describes a known problem with a device or service, which the agent may have to answer inquiries about. The problem description is linked to one or more solution descriptions, which are known or expected to address the problem. The solutions may each be laid out as a sequence of steps which are to be performed by the customer. These solution descriptions are often indexed by keywords to enable the agent to search them quickly with a set of keywords or with a natural language-based search. For a description of such problem-solution knowledge bases, see, for example, U.S. Pub. No. 20070192085, published Aug. 16, 2007, entitled NATURAL LANGUAGE PROCESSING FOR DEVELOPING QUERIES, and U.S. Pub. No. 20090106224, published Apr. 23, 2009, entitled REAL-TIME QUERY SUGGESTION IN A TROUBLESHOOTING CONTEXT, both by Frederic Roulland, et al., and U.S. Pub. No. 20140288920, published Sep. 25, 2014, entitled ASSISTED UPDATE OF KNOWLEDGE BASE FOR PROBLEM SOLVING, by Denys Proux, the disclosures of which are incorporated herein by reference.

In the exemplary embodiment, the knowledge base 70 may have been pre-processed to identify a set 72 of keywords (often domain-specific terms) occurring in the knowledge base and to compute a measure of their salience. The salience measure for each keyword can be a value from within a range of values, where higher numbers may be used to indicate higher salience. The identified terms 72 and their respective saliencies may be stored in memory 12. Various methods can be used for computing the salience, such as a statistics-based method, e.g., term frequency—inverse document frequency (tf-idf), or by using a predefined terminology/ontology of the domain and calculating a similarity score between the knowledge base terms 72 and the terminology/ontology (e.g., exact match, substring of, approximate string matching, or advanced techniques such as semantic similarity (e.g., computed based on an ontology such as Wordnet or/and statistical techniques)). The salience of keywords 66 extracted from the dialogue can thus be based on a measure of occurrence of the corresponding terms 72 found in the knowledge base 70. Each keyword/term includes a sequence of characters and can include one or more words, letters, and/or numbers.

As the dialogue proceeds, agent communications 74, 76, interspersed with customer communications 78, 80 are displayed in the GUI. The GUI may display only a most recent set of the communications if the amount of text is too large to fit in the panel 63, optionally with a scroll functionality to allow the agent to look back at earlier ones.

The keyword identification component 52 searches the dialogue 60, which may include searching some or all of the textual content of the customer's communications 78, 80 (and optionally also the agent's communications 74, 76), generated so far, to identify keywords that are found in the list of KB terms 72. By "found" it is meant that the exact words, their root forms, or in some embodiments, similar terms, are present in the KB set 72. The matching keywords 66 found are used to populate the search box 68. In the exemplary embodiment, no Natural Language Processing (e.g., extraction of syntactic dependencies between words) is performed on the communications, they are simply processed to extract keywords, allowing standard IR techniques based on term similarity to be used to retrieve search results. If there are a large number of keywords identified, they may be filtered, for example, to retain only the most salient, or the ones used most in the dialogue. The agent can view the displayed keywords 66 in the search box 68 and may modify them, e.g., remove and/or add to them or select/deselect them.

The meta-search engine 54 receives the optionally agent-edited keywords 66 in the search box and generates a search query 82 based on the keywords. The search query can simply be an optionally-weighted set of keywords (e.g., using weights that are or that are based on the respective salience). The search query 82 is used to search the knowledge base 50 and also to perform a web search of external resources, such as websites 84, 86. Different search engines may be used for the internal and external parts of the search query, such as a dedicated search engine for the knowledge base search and one or more external search engines for searching the external resources. The websites 84, 86 may host discussion forums which allow users to post queries and/or to post solutions to posted queries. There may be one or more such discussion forums that are dedicated to the products/services of relevance, or to a broader class of products/services, which the agent's in the customer care center frequently query when searching for solutions. These particular website(s) are then used for conducting the search. Such external sources tend to evolve continuously and thus it may be advantageous to use a sizeable number of keywords in the search, not all of which need to be present in a given document for the document to be retrieved in a search.

As used herein, the term "document" includes both the documents forming the knowledge base and unstructured text documents retrieved from an external website, such as web pages or portions thereof, in which the text may comprise a sequence of text strings, e.g., sentences, in a natural language. The term "results" refers to the retrieved documents themselves or to information extracted therefrom.

The results ranking component 56, which may be a part of the meta-search engine, receives the results from the search, parses them, and ranks them, placing higher weight on results from the knowledge base 50 than on those retrieved from the external websites 84, 86, etc. The ranking may also take into account the salience of the particular keywords that were responsible for each document being retrieved. For example, a document that was retrieved on the basis of two highly salient keywords may be ranked higher than a document that included a larger number of less salient keywords. Keywords 66 that were added by the agent may be automatically be assigned a high salience, irrespective of their precomputed KB salience, if any.

The GUI generation component 50 sends information 87 to the agent's device which causes one or more of the top ranked results 88, 90, 92, or relevant portions thereof, to be displayed to the agent in a results box 94 of the solution panel 64. In some embodiments, the top-ranked document is displayed first and the next one may be displayed when the agent clicks on a 'next' button. A flag 96, denoting the source of each result, may be displayed next to it. The keywords may be highlighted in the text.

The agent can quickly copy a relevant portion 98 of one or more of the results 90 and paste it into his response 100, as illustrated at 102, making suitable modifications as needed to tailor the response to the customer's inquiry.

In the exemplary embodiment, an automatic search functionality 104 is provided. During a textual dialogue with a customer, the status of the automatic search function is set to active when the agent's focus (e.g., as defined by the mouse cursor 106 hovering) is on the chat panel 63, and is set to inactive when the agent's focus is on the solution panel 64. This feature can also be turned on/off by the agent manually (e.g., via a button 108 on the right pane). This can help to avoid distracting the agent when his attention needs to be on the chat panel by keeping the content of the solution panel static.

In one embodiment, the agent may be able to limit the utterances which are used in generating the keywords 66. For example, the agent may click on check boxes 110 to have certain utterances excluded (or included).

With reference now to FIG. 2, a computer-implemented method which can be performed with the system of claim 1 is illustrated. The method begins at S100.

At S102, a meta-search engine is defined that aggregates a number of pre-registered search engines, e.g., a proprietary knowledge base search engine, StackExchange, etc. The list can be updated based on the agent's and/or company suggestions.

At S104, a textual dialogue between a customer and an agent is initiated and detected by the system.

At S106, a text communication (utterance) is received from the customer and may be stored in memory.

If at S108, the automatic search status is set to 'Active', the method proceeds to S110, otherwise the method waits for the search status to become active.

At S110, if the automatic search status is 'Active,' after each new customer text communication in the dialogue (and optionally after each agent's text communication also), a set of relevant keywords 66 is extracted from the dialogue content (which may include a first up to a last customer/agent text communication), by the keyword identification component 52. As each new customer text communication is received, the relevant keywords set is updated (if different). The relevant keywords set 66 is computed based on the salience of a set of terms 72 occurring in the knowledge base 70 (that generally represent domain-specific terms). Each keyword 66 is assigned a salience score based on the computed salience of the corresponding knowledge base term 72. In one embodiment, only those keywords with a salience score above a threshold are kept to build the relevant keywords set 66. The threshold can be defined/changed by the agent or during system maintenance, depending on the coverage of the local KB terminologies. When the threshold=0, all words are considered relevant and used for the search query, except for stop words. The weight of each keyword in the search query (or in the ranking) can still depend on its salience score. The keywords are shown to the agent in a text box 68 at the top of the solution panel 64 and the agent can add/remove keywords at any point.

If at S112, the new set of keywords 66 is different from the previous one (or is the first set of keywords to be extracted), then at S114 search results are retrieved. This may include automatically launching a new search query and receiving results of the search, by the meta-engine. At S116, the results are ranked by the ranking component 56. Greater weight may be placed on any retrieved knowledge base results, making them appear higher in the list of results than comparably responsive results from external websites.

At S118, a list of results and one or more of the top-ranked document(s) are caused to be displayed, by the GUI generation component 50, in the solution panel 63.

The agent can examine the displayed solution and click 'next' to go to the next one in the ranked list. As long as the agent's mouse cursor is on the solution panel 64, the automatic search update is inactive. If the agent actuates the button 108 to activate/deactivate the automatic search, the state of the automatic search update is set to inactive. For example, if the agent is satisfied with a solution, he can copy/paste it into the chat window without being disturbed by automatic search updates.

The agent submits the response, which is sent to the customer at S120. As will be appreciated, the customer may respond with one or more further utterances and the method may return to S106.

The method ends at S122.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 24, (for example, an internal hard drive of RAM), or may be separate (for example, an external hard drive operatively connected with the computer 24), or may be separate and accessed via a digital data network such as a local area network (LAN) or the Internet (for example, as a redundant array of inexpensive of independent disks (RAID) or other network server storage that is indirectly accessed by the computer 24, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement all or part of the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Some advantages of the exemplary system and method include:

1. Automatically building the search query and launching it. This is more time-efficient as compared to manually copying/pasting a piece of text and launching a search. Moreover, the use of the meta-search engine helps to reduce the search time further as compared with manual searching using more than one search engines and can improve the coverage of the results.

2. The agent is able to change focus less frequently between interacting and searching. The agent can stay focused on the customer's utterances while the system generates the search and retrieves results automatically.

3. Automatic selection of keywords for the search query based on their salience can often yield better query results than a fully manual process (this may depend, in part, on the experience of the agent) and may help with time-efficiency.

Example

The following example dialogue is based on real customer communications and illustrates how the proposed method could be of benefit.

1. 12:29:11—Agent: Hi there, thanks for contacting Customer Care. My name is Agent, how can I assist you today?
2. 12:29:27—Customer: how do you put the htc one into mass storage mode so we can transfer pics with cellbrite?
3. 12:32:04—Agent: That's an excellent question, I can definitely help you with that.
4. 12:32:47—Agent: I've been doing a bit of research but haven't found much yet, and it's so new that it's not in our simulators yet.
. . .
5. Agent: When plugging up to the charging port, do you get a USB icon in the notification bar?

As it can be seen in the above dialogue, the customer expresses his search need at time 12:29:27 and gets two answers from the agent after 2 mins 40 secs (typical answer to gain more time) and 3 mins 20 secs. The second answer reveals that the agent found nothing in the native KB. After that, he answers with utterance 5. This utterance gives a root cause that relates to a solution that can be found using the Google search engine, using the keywords of utterance 2 (the first customer utterance). This conclusion has been reached after more than a 3 minute time interval between the customer's question and agent's reply.

With the exemplary method, the time taken to extract the keywords, write the search query, and give a response (instead of turning to another dialogue) could be reduced dramatically.

The method also has advantages over conventional information retrieval. In the exemplary method, the chain of selection of salient keywords, query building, and displaying of results online during the chat is automatic. The search query and displayed results are automatically updated based on the evolution of the dialogue.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for assisting an agent comprising:
providing access to a knowledge base which is structured as a set of problems with a device or service, each problem being linked to a set of one or more solutions to the problem, the knowledge base having been preprocessed to extract a set of terms occurring in the knowledge base, each of the terms in the set of terms extracted from the knowledge base being associated with a salience;
during a dialogue comprising text communications between a customer and an agent, generating and displaying a graphical user interface in which the text communications are displayed to an agent on a display device in a first region of a window, the communications including customer text communications generated by the customer and agent text communications generated by the agent;
determining that the agent's cursor is hovering over the first region;
in response to the determination, activating an automatic search function, including:
extracting keywords from at least one of the customer text communications, the extraction comprising identifying keywords in the customer text communication that are found in the set of terms extracted from the knowledge base;
generating a search query based on the keywords extracted from the at least one customer communication;
submitting the search query to the knowledge base and to an external website;
retrieving results of the search query from at least one of the knowledge base and an external website;
ranking the retrieved results; and
during the dialogue, providing for at least one of the highest-ranked results of the search query to be displayed on the display device contemporaneously with at least a portion of the text communications, including generating and displaying a graphical user interface in which the text communications are displayed in the first region of a window and the at least one result is displayed in a second region of the same window,
wherein the salience of the terms corresponding to the extracted keywords is used in at least one of the generating of the search query and the ranking of the retrieved results, and
wherein the providing access, generating and displaying an interface, determining the agent's cursor, extracting keywords, generating a search query, retrieving results of the search query, and providing for the display of the result are performed with a computer processor.

2. The method of claim 1, wherein the method further comprises providing for the agent to copy and paste text from the displayed result into a text communication from the agent to the customer.

3. The method of claim 1, wherein the ranking of the retrieved results includes applying a higher weighting to results that are retrieved from the knowledge base than to results that are retrieved from the external website.

4. The method of claim 1, further comprising updating the search query when keywords extracted from a later of the customer text communications differ from keywords extracted from at least one earlier one of the customer text communications.

5. The method of claim 1, wherein the method comprises extracting keywords each time a new customer text communication is received and, if the keywords are different, updating the search query based on the keywords extracted from the at least one customer communication.

6. The method of claim 1, wherein the method further includes determining whether a search status is active and, only if the search status is active, providing for results of an updated search query to be displayed on the display device.

7. The method of claim 6 wherein the search status is activatable by the agent.

8. The method of claim 1, further comprising providing for the agent to modify the identified keywords on which the search query is based.

9. The method of claim 1, wherein the salience of each term is based on a measure of occurrence of each term in the knowledge base.

10. The method of claim 1, wherein the identifying of the keywords in the text communication comprising identifying a set of keywords corresponding to terms having a highest salience.

11. The method of claim 1, wherein the extracting keywords further includes extracting keywords from at least one of the agent's text communications in the dialogue.

12. A computer product comprising a non-transitory storage medium storing instructions, which when executed by a computer, perform the method of:
   providing access to a knowledge base which is structured as a set of problems with a device or service, each problem being linked to a set of one or more solutions to the problem, the knowledge base having been pre-processed to extract a set of terms occurring in the knowledge base, each of the terms in the set of terms extracted from the knowledge base being associated with a salience;
   during a dialogue comprising text communications between a customer and an agent, generating and displaying a graphical user interface in which the text communications which are displayed to an agent on a display device in a first region of a window, the communications including customer text communications generated by the customer and agent text communications generated by the agent;
   determining that the agent's cursor is hovering over the first region;
   in response to the determination, activating an automatic search function, including:
   extracting keywords from at least one of the customer text communications, the extraction comprising identifying keywords in the customer text communication that are found in the set of terms extracted from the knowledge base;
   generating a search query based on the keywords extracted from the at least one customer communication;
   submitting the search query to the knowledge base and to an external website;
   retrieving results of the search query from at least one of the knowledge base and an external website;
   ranking the retrieved results; and
   during the dialogue, providing for at least one of the highest-ranked results of the search query to be displayed on the display device contemporaneously with at least a portion of the text communications, including generating and displaying a graphical user interface in which the text communications are displayed in a first region of a window and the at least one result is displayed in a second region of the same window,
   wherein the salience of the terms corresponding to the extracted keywords is used in at least one of the generating of the search query and the ranking of the retrieved results.

13. A system comprising memory which stores instructions for performing the method of claim 1 and a processor in communication with the memory for executing the instructions.

14. A system for assisting an agent comprising:
   a knowledge base structured as a set of problems with a device or service, each problem being linked to a set of one or more solutions to the problem, the knowledge base having been pre-processed to extract a set of terms occurring in the knowledge base;
   a graphical user interface generating component which generates and displays a graphical user interface in which the text communications are displayed to an agent on a display device in a first region of a window, the communications including customer test communications generated by the customer and agent text communications generated by the agent;
   memory which stores the set of terms extracted from a knowledge base, each of the terms in the set of terms extracted from the knowledge base being associated with a salience, the salience of each term in the set of terms being based on a measure of occurrence of each term in the knowledge base;
   a search functionality to determine that an agent's cursor is hovering over the first region of the interface;
   a keyword identification component which, during a textual dialogue comprising text communications between a customer and an agent which are displayed to an agent on an associated display device, extracts keywords from at least one of the customer text communications in response to the determination that an agent's cursor is hovering over the first region of the interface, the extraction comprising identifying keywords in the text communication that are found in the set of terms extracted from the knowledge base;
   a meta-search engine for generating a search query based on the keywords extracted from the at least one customer communication and for retrieving results of the search query from the knowledge base and an external website in response to the determination that an agent's cursor is hovering over the first region of the interface;
   a results ranking component which ranks the results based on whether the results were retrieved from the knowledge base or from the external webpage in response to the determination that an agent's cursor is hovering over the first region of the interface, the ranking also taking into account a salience of the keywords that were responsible for each retrieved result, the salience of the keywords being based on the salience of the respective terms;
   the graphical user interface generation component which, during the textual dialogue, generates a graphical user interface for display on the display device, the graphical user interface displaying one of the results of the search query while contemporaneously displaying at least a portion of the text communications in a same window; and a processor for implementing the keyword identification component, meta-search engine, and graphical user interface generation component.

15. A method for assisting an agent to respond to a customer's query, comprising:
providing access to a knowledge base which is structured as a set of problems with a device or service, each problem being linked to a set of one or more solutions to the problem, the knowledge base having been pre-processed to extract a set of terms occurring in the knowledge base, each of the terms in the set of terms extracted from the knowledge base being associated with a salience, the salience of each term in the set of terms being based on a measure of occurrence of each term in the knowledge base;
in a first region of a graphical user interface, displaying communications between the customer and the agent, the communications including customer text communications generated by the customer interspersed with agent text communications generated by the agent;
determining that the agent's cursor is hovering over the first region;
in response to the determination, activating an automatic search function, including:
extracting keywords from the customer text communications, the extraction comprising identifying keywords in the customer text communication that are found in the set of terms extracted from the knowledge base, a salience of the keywords extracted from the dialogue being based on the salience of the respective terms;
querying the knowledge base and an external website based on the keywords extracted from the at least one customer communication;
ranking the retrieved results based on, for each result, at least one of:
whether the result is present in the knowledge base; and
the computed salience of the keywords that retrieved the result;
in a second region of the graphical user interface, displaying retrieved results of the search query, whereby the agent is able to read one of the customer's communications and generate a communication in response thereto using text of one of the results,
wherein the displaying communications, extracting keywords, querying the knowledge base and the external website, and displaying retrieved results are performed with a computer processor.

16. The method of claim 1, further comprising setting the search function to inactive when the agent's cursor is determined to be hovering over the second region.

* * * * *